US012654177B2

(12) United States Patent
Peljhan et al.

(10) Patent No.: US 12,654,177 B2
(45) Date of Patent: Jun. 16, 2026

(54) CENTRIFUGE ROTOR, CENTRIFUGE OR ULTRACENTRIFUGE COMPRISING CENTRIFUGE ROTOR, SAMPLE RETRACTION NEEDLE, METHOD FOR IN-SITU SAMPLE RETRACTION FROM A CENTRIFUGE TUBE

(71) Applicant: SARTORIUS BIA SEPARATIONS d.o.o., Ajdovščina (SI)

(72) Inventors: Sebastijan Peljhan, Ajdovščina (SI); Aleš Štrancar, Ajdovščina (SI); Maja Štokelj, Ajdovščina (SI); Božo Žgavc, Ajdovščina (SI); Kristina Eleršic Filipic, Sevnica (SI)

(73) Assignee: SARTORIUS BIA SEPARATIONS d.o.o., Ajdovscina (SI)

( * ) Notice: Subject to any disclaimer, the term of this patent is extended or adjusted under 35 U.S.C. 154(b) by 189 days.

(21) Appl. No.: 18/277,737

(22) PCT Filed: Feb. 21, 2022

(86) PCT No.: PCT/EP2022/054175
§ 371 (c)(1),
(2) Date: Aug. 17, 2023

(87) PCT Pub. No.: WO2022/175506
PCT Pub. Date: Aug. 25, 2022

(65) Prior Publication Data
US 2024/0131530 A1      Apr. 25, 2024
US 2024/0226917 A9      Jul. 11, 2024

(30) Foreign Application Priority Data
Feb. 22, 2021    (EP) ..................................... 21158410

(51) Int. Cl.
*B04B 11/05*      (2006.01)
*B04B 5/04*       (2006.01)
(Continued)

(52) U.S. Cl.
CPC ............ *B04B 11/05* (2013.01); *B04B 5/0421* (2013.01); *G01N 35/10* (2013.01); *G01N 2035/00495* (2013.01)

(58) Field of Classification Search
CPC ....... B04B 11/05; B04B 5/0421; G01N 35/10; G01N 2035/00495
(Continued)

(56) References Cited

U.S. PATENT DOCUMENTS 3,361,343 A * 1/1968 Lerner .................. B04B 5/0421
                                                              494/20
3,682,305 A * 8/1972 Buchler ................ B01L 3/0293
                                                              210/744
(Continued)

FOREIGN PATENT DOCUMENTS

CN          1842706 A  * 10/2006  ............... C07K 1/36
CN       101875921 A  * 11/2010
(Continued)

OTHER PUBLICATIONS

International Search Report for corresponding Patent Application No. PCT/EP2022/054175 dated May 30, 2022.
(Continued)

*Primary Examiner* — Stephanie E Bloss
*Assistant Examiner* — Kevin C Butler
(74) *Attorney, Agent, or Firm* — Christensen, Fonder, Dardi, Busse; Diane E. Bennett; Peter S. Dardi

(57)      ABSTRACT

Centrifuge rotor comprising a rotor assembly adapted for centrifugal rotation around a rotation centre axis, with a plurality of centrifuge tube beds, each with a longitudinal
(Continued)

Figure 1:
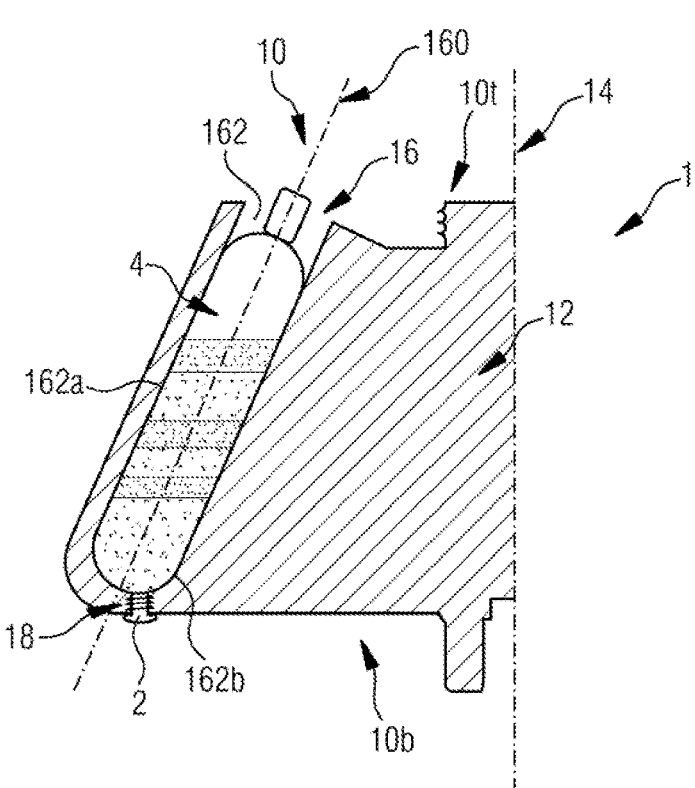

axis, wherein each centrifuge tube bed comprises a tubular cavity which is defined by a cavity sidewall and a cavity bottom which together act as a bearing surface for the outer surface of a centrifuge tube when received in said centrifuge tube bed, wherein at least one of the plurality of cavity bottoms comprises at least one extraction aperture, which connects the tubular cavity to the exterior of the rotor assembly, preferably wherein at least one closure device is removably fastened to the rotor assembly to seal each of the at least one extraction apertures in an airtight manner.

18 Claims, 5 Drawing Sheets

(51) Int. Cl.
*G01N 35/00* (2006.01)
*G01N 35/10* (2006.01)
(58) Field of Classification Search
USPC ...................................................... 73/863.01
See application file for complete search history.

(56) References Cited

U.S. PATENT DOCUMENTS

| | | | | |
|---|---|---|---|---|
| 3,682,374 A | * | 8/1972 | Joyce | B04B 5/04 |
| | | | | 494/33 |
| 3,871,270 A | | 3/1975 | Kuckhermann et al. | |
| 4,372,483 A | * | 2/1983 | Wright | B04B 5/0414 |
| | | | | 494/38 |
| 4,511,349 A | * | 4/1985 | Nielsen | B01L 3/5021 |
| | | | | 422/918 |
| 4,962,041 A | * | 10/1990 | Roginski | G01N 35/0099 |
| | | | | 324/687 |
| 5,328,440 A | * | 7/1994 | Chen | B04B 5/0421 |
| | | | | 494/20 |
| 5,866,071 A | * | 2/1999 | Leu | B01L 3/5021 |
| | | | | 210/512.1 |
| 6,077,662 A | * | 6/2000 | Compans | A61K 39/21 |
| | | | | 435/69.3 |
| 7,921,625 B1 | * | 4/2011 | Mayer | G01N 1/2226 |
| | | | | 73/49.3 |
| 2008/0318755 A1 | * | 12/2008 | Yamada | B04B 15/06 |
| | | | | 494/9 |

FOREIGN PATENT DOCUMENTS

| | | | | | |
|---|---|---|---|---|---|
| CN | 108031561 A | * | 5/2018 | ............... | B04B 9/10 |
| CN | 208147961 U | * | 11/2018 | | |
| CN | 210207236 U | * | 3/2020 | | |
| CN | 118146932 A | * | 6/2024 | ............... | B04B 9/02 |
| CN | 119064300 B | * | 2/2025 | ............... | B04B 7/00 |
| EP | 1498735 A2 | * | 1/2005 | ......... | G01N 35/1079 |
| EP | 1674081 A1 | * | 6/2006 | ......... | A61K 47/6913 |
| FR | 2559075 A1 | * | 8/1985 | ............. | B04B 15/02 |
| FR | 3082899 A1 | | 12/2019 | | |
| IT | MI20080228 A1 | * | 8/2009 | ............... | B04B 9/14 |
| JP | S49-63575 U | | 6/1974 | | |
| JP | S56-073564 A | | 6/1981 | | |
| JP | H0852212 A | * | 2/1996 | ......... | A61M 5/3286 |
| JP | 2009189280 A | * | 8/2009 | ............. | B04B 11/04 |
| JP | 4351875 B2 | * | 10/2009 | ......... | G01N 35/1016 |
| JP | 4911434 B2 | * | 4/2012 | ............. | B04B 15/12 |
| WO | WO-2013138465 A1 | * | 9/2013 | ............... | C12N 7/00 |
| WO | WO-2015048844 A1 | * | 4/2015 | ............. | G01N 33/50 |

OTHER PUBLICATIONS

Search Report from corresponding European Application No. 21158410 dated Sep. 24, 2021.
Office Action from corresponding Japanese Patent Application No. 2023-547891 dated Nov. 11, 2025.
Office Action from corresponding Chinese Patent Application No. 202280016427.3 dated Sep. 29, 2025.

* cited by examiner

CENTRIFUGE ROTOR, CENTRIFUGE OR ULTRACENTRIFUGE COMPRISING CENTRIFUGE ROTOR, SAMPLE RETRACTION NEEDLE, METHOD FOR IN-SITU SAMPLE RETRACTION FROM A CENTRIFUGE TUBE

CROSS REFERENCE TO RELATED APPLICATIONS

This application is a National Stage filing of PCT Application No. PCT/EP2022/054175 filed Feb. 21, 2022, entitled "Centrifuge Rotor, Centrifuge or Ultracentrifuge, Method for IN-SITU Sample Retraction from a Centrifuge Tube", which claims priority to European Patent Application No. 21158410.7, filed Feb. 22, 2021.

The present invention relates to a centrifuge or an ultracentrifuge and, more specifically, to a centrifuge or ultracentrifuge rotor which are used in the process for the separation of liquid materials of cellular organelles, viruses, virus-like particles, bacteriophages, exosomes and nanoparticles using aforesaid centrifuge or ultracentrifuge. Furthermore, the current invention describes a sample retraction needle, a method for in-situ sample retraction from a centrifuge tube which is housed in a centrifuge tube bed of a centrifuge or ultracentrifuge rotor and is further directed to the usage of a centrifuge rotor and a sample retraction needle to conduct the method for in-situ sample retraction.

The current invention describes an ultracentrifuge rotor or centrifuge rotor that enables liquid sample collection and liquid sample fractionation from ultracentrifugation and centrifugation process in-situ, without removing the centrifuge tube from the centrifuge tube rotor assembly or centrifuge tube bucket. A self-sealing design of a sample retraction needle is further described to enable an automated sample withdrawal from a centrifuge tube which is still housed within the rotor assembly of a centrifuge rotor.

BACKGROUND OF THE INVENTION

Centrifugation and ultracentrifugation are one of the fundamental techniques for separating fine particulate fractions, such as cellular organelles (US 2006/266715 A1), viruses (U.S. Ser. No. 10/066,213 B2), virus-like particles (U.S. Pat. No. 6,077,662 A), bacteriophages (AU 680279 B2), exosomes (WO 2015/048844 A1), and nanoparticles (WO 2006/069985 A2). Centrifugation and ultracentrifugation techniques include pelleting where particulate fractions are gradually removed from the suspension by forming the pellets at the bottom of the tube. Gradient separations, in which the tubes are filled from top to bottom with an increasing concentration of a dense substance in a solution, are also often used to separate particulate fractions based on particulate fraction density and particulate fraction sedimentation coefficient. Samples are spun at high speed for sufficient time to achieve the separation. After the centrifugation or ultracentrifugation, the rotor is allowed to come to a smooth stop, and the gradient is gently withdrawn out of each tube to isolate the separated components by using different approaches.

Centrifuges and ultracentrifuges are available with a wide variety of rotors suitable for a great range of experiments. Recently, the development of the centrifuges is mainly focused on automated sample filling (US 2008/318755 A1) and automated operation of the centrifugation devices (U.S. Pat. No. 8,795,144 B2).

Centrifugation and ultracentrifugation tubes are available in different sizes and formats to accommodate different sample volumes and different centrifugation and ultracentrifugation techniques to maintain the liquid sample within the tube.

Density gradient preparation in tube and sample withdrawal/extraction from the tube after the centrifugation or ultracentrifugation represent a particular bottleneck of these processes. One option to withdraw the samples from the centrifuge test tube is by puncturing a hole in tube with a hypodermic needle (CN 208147961 U), wherein this approach has several disadvantages. In a case that the plastic material of production centrifuge tube is tougher, or the tube wall has a certain thickness, the hypodermic syringe needle may be easily bent during the process of puncturing the tube. Further when the needle is forcibly inserted into a centrifuge tube, the procedure introduces violent shaking, which upsets and partially mixes the generated layers of gradient and separated components. Liquid leakages are also often experienced when conducting needle sample retraction from the centrifuge tubes. The leak is often prevented by smearing a thin layer of Vaseline in advance on the site of puncture which causes a risk of contamination of the extracted samples. Regions or density gradient layers of interest are often located visually what introduces additional errors during sample recovery.

When puncturing the tube wall, the soft plastic material of the tube may clog the needle tube of the extraction needle therefore, the needle is often required to be replaced before material collection. A venting hole is also punctured manually with a bevelled steel hypodermic needle at the top of the centrifuge tube. Sample collection cannot be automated by using this approach; therefore, operational time and operational costs cannot be reduced. Personal visual identification of regions of interest as well as manual insertion of the needle is highly inaccurate and results in irreproducible results. Additionally, fractionation of material is uncontrolled. Fractions are collected by volume, and supplementary analytical procedures are required to characterize fractions. If larger sizes of fractions are obtained during fractionation, an increased risk of fraction dilution or fraction contamination with adjacent components is present.

In some cases, sample retraction is performed by using a siphon effect or by sucking the sample from the centrifugation tube by using a dedicated sample pump. The tube is pushed to the bottom of the centrifuge tube (CN 101875921 A) or specifically designed centrifuge tubes that already comprise siphon tubes (U.S. Pat. No. 5,866,071 A) are used for this purpose. Retraction of the sample from the centrifuge tube by siphon or by sucking has further disadvantages. The sample can be substantially disturbed when the tube is inserted to the bottom of the centrifuge tube. If a diameter of the siphon tube is too large, differences in liquid density result in mixing of the liquids of different densities in the siphon tube. Namely, first the most dense liquid is forced to move upwards in a siphon tube. When less dense liquid enters the tube, denser liquid spontaneously starts to gravitate back to the bottom of the tube, resulting in a mixed solution.

Alternatively, sample can be retracted from the centrifuge tube by upward displacement by using a low viscosity, dense, non-water-miscible liquid like perfluorodecalin. Similar to siphoning, a tube is required to be inserted to the bottom of centrifuge tube, what induces disturbances of separated layers. Introduction of displacement liquid also represent a risk of material contamination. Decanting apparatus can also be implemented for layered sample retraction (U.S. Pat. No. 3,682,305 A).

Centrifuge tubes with multiple sealable chambers are sometimes used to prevent component mixing after the centrifugation procedure (U.S. Pat. No. 4,511,349 A). This approach requires to determine the position of molecule of interest in a density gradient beforehand. Centrifuge tubes that fit the separation properties of specific application is needed, and one-to-fit-all design of the centrifuge tube is impossible to create.

Careful manual handling is required to place or remove the tubes into or from the centrifuge tube bucket or rotor, due to the high risk of perturbing density gradient or layers of separated components in the density gradient. Gradient perturbation may result from shaking the tube, inverting the tube, or placing a tube in inappropriate orientation (lying flat on the table). A centrifuge tube protection system has been proposed for sample recovery from the centrifuge tube. Centrifuge tubes are enclosed in a protective bracket, the bottoms of the centrifuge tubes are pierced with hypodermic syringe needle and the content of the centrifuge tube is eluted and fractionated. A number of centrifuge tubes can be processed simultaneously in a controlled environment (CN 210207236 U). Still, the approach requires the transfer of the tubes from the positions in the centrifuge rotor or bucket to the protective bracket, what might result in sample disturbance.

Sterility is difficult to establish and maintain with manual material withdrawal from the tube since aseptic connections between the equipment cannot be verified. The bevelled steel hypodermic needle represents a safety risk for the operator since the sharp bevel can easily penetrate the protective garment of the operator. Injuries from bevelled steel hypodermic needle pose a two-way risk of contamination. Namely, the operator can be exposed to potentially harmful substances, or the product can be contaminated with operator tissues or body fluids.

Starting from the aforementioned described disadvantages, of the known prior art with respect to centrifuges, ultracentrifuges and the sample extraction devices and methods, it is the task of the current invention to provide an improved centrifuge or ultracentrifuge which enables a more reliable and robust retraction method and respective devices to support such an improved method, which enable reproducible retraction results and further enable to use an automated process without necessitating manual user intervention. Thus improving the safety and efficiency of the methods and devices.

The task of the current invention is solved by the features of a centrifuge rotor according to independent claim 1, a centrifuge or ultracentrifuge according to independent claim 9, a sample retraction needle, a method for in-situ sample retraction according to independent claim 10 as well as by the usage of a centrifuge rotor.

According to a first aspect of the current invention, a centrifuge rotor or ultracentrifuge rotor is provided which comprises a rotor assembly adapted for centrifugal rotation around a rotation centre axis with a plurality of centrifuge tube beds each with a longitudinal axis. Each of the aforementioned centrifuge tube beds comprises a tubular cavity which is defined by a cavity side wall and a cavity bottom which together act as a bearing surface for the outer surface of a centrifuge tube when received in said centrifuge tube bed, wherein at least one of the plurality of cavity bottoms comprises at least one extraction aperture which connects the tubular cavity to the exterior of the rotor assembly.

Following aforesaid, the inner volume formed by the tubular cavity of the centrifuge tube bed may be connected to the atmosphere surrounding the rotor assembly by foreseeing at least one extraction aperture in the cavity bottom. Further, at least one closure device can be foreseen which is removably fastened to the rotor assembly to seal each of the at least one extraction apertures in an airtight manner.

The centrifuge rotor may be adapted for ultracentrifugation.

The at least one extraction aperture which connects the tubular cavity to the exterior of the rotor assembly provides the advantage that the a centrifugation tube which is housed and supported in the centrifuge tube bed of the centrifuge rotor can be reached and also accessed by the usage of an extraction device in the area of the bottom of the centrifuge tube. The configuration according to the current invention enables to insert an extraction device like an sample retraction through the at least one extraction aperture and pierce the housed centrifugation tube by said device to extract a sample housed in said centrifugation tube when still housed in the rotor assembly. The centrifuge rotor assembly comprises at least one access well/extraction aperture which is located at the bottom of the centrifuge tube that allows sample collection and sample fractionation from ultracentrifugation and centrifugation process in situ, without the requirement of removing the centrifuge tube from the centrifuge tube bed in the centrifuge rotor. The ultracentrifuge and the centrifuge rotor design may vary to accommodate centrifuge tubes with various sizes, materials, and sealing means.

The centrifugation tube is made of a material that allows the sample extraction device to pierce the centrifugation tube without breaking the material. In preferred embodiments the centrifugation tube is made of a material comprising polypropylene, polypropylene copolymer, polysulphone, Nalgene, or HDPE.

When a plurality of centrifuge tube beds is foreseen in the rotor assembly, it is preferred that at least one extraction aperture is foreseen respectively for each of the foreseen number of centrifuge tube beds, thereby enabling an extraction from each of the aforesaid plurality of centrifuge tube beds. Nevertheless, it can also be foreseen that only a dedicated number of the plurality of centrifuge tube beds is equipped with the aforementioned at least one extraction aperture in its cavity bottom.

The at least one closure device enables to seal each of the at least one extraction apertures, thereby, the at least one closure device can be formed as single and independent devices which can be fastened or unfastened from the rotor assembly, preferably independent from each other. Thereby enabling to gain access to a dedicated centrifuge bed of the plurality of centrifuge beds and to enable an extraction from a chosen specific centrifuge tube bed.

Nevertheless, in an alternative embodiment of the current invention, it can also be foreseen that the at least one closure device is formed as a single device which enables to seal or unseal each of a foreseen plurality extraction apertures at the same time and thereby enabling, for example, the access to all of the plurality of centrifuge beds by the plurality of foreseen extraction apertures.

The cavity bottom of each of the centrifuge bed has typically a narrowing shape towards the bottom of the centrifuge rotor, as an example, the cavity bottom may be formed as a hemisphere, a cone, a cylindrical cone or a truncated cone which is extending from the lower end of the cavity side wall in the direction of the longitudinal axis of the centrifuge tube bed. Each of the at least one closure device enables to seal a single or alternatively a plurality each of the plurality of extraction apertures in a fluid tight and thereby air and liquid tight manner.

Preferably, the rotor assembly is formed as a fixed angle rotor which is formed by a rotor body, wherein the plurality of tube beds are formed as tubular cavities within the rotor body and wherein the at least one extraction aperture extends through the aforementioned rotor body.

The extraction aperture is located at the lowest point of the centrifuge bed with respect to the rotation axis, thereby, the extraction aperture is located in the area of the cavity bottom which forms the lowest point of the centrifuge tube bed. The longitudinal axis of each of the centrifuge beds is inclined relative to the rotation centre axis of the centrifuge rotor, wherein the lowest point of the centrifuge tube bed has a greater distance to said rotation centre axis in a horizontal direction than the upper part of the centrifuge bed in the area of the cavity side walls. In the current invention, a near vertical rotor is also considered as a fixed angle rotor and should also fall under the scope of protection of the current invention.

In an alternative embodiment, the rotor assembly is formed as a swing bucket rotor comprising a plurality of rotor buckets pivotally connected to a rotating stem. The plurality of rotor buckets comprises at least one tubular cavity to form the centrifuge tube bed and wherein the at least one extraction aperture extends through a body of the respective rotor bucket. The centrifuge tube bucket dimension may be varied to fit centrifuge tubes with various sizes, materials, and sealing means.

Each of the plurality of rotor buckets is pivotally connected to the rotating stem to swing out with respect to the aforementioned rotating stem when the centrifuge rotor is rotated around the rotation centre axis. The centrifuge bed is foreseen as a cavity in the rotor bucket, wherein the longitudinal axis of the centrifuge bed extends in the non-rotating and unswung condition parallel to the rotation centre axis. When rotating the swing bucket rotor, the buckets of the rotor are swung out with respect to the rotating stem and the rotation centre axis and thereby, the longitudinal axis of each of the centrifuge beds are inclined/tilted with respect to said rotation centre axis. The extraction aperture is located at the lowest point of the centrifuge tube bed with respect to the rotation centre axis when, in the non-rotating condition, thereby, the extraction aperture is located in the area of the cavity bottom, which forms the lowest point of the centrifuge tube bed. The longitudinal axis of each of the centrifuge tube beds extends parallel relative to the rotation centre axis when in the non-rotating condition. In the swung out position of the rotor buckets during rotation of the centrifuge the longitudinal axis of each of the centrifuge beds is inclined relative to the rotation centre axis of the centrifuge rotor, wherein the lowest point of the centrifuge tube bed has a greater distance to said rotation centre axis in a horizontal direction than the upper part of the centrifuge bed in the area of the cavity side walls.

Preferably, the closure device comprises a shaft extending along a shaft axis from a first end to a second end, wherein the shaft is adapted to the geometry of the extraction aperture, wherein the first end forms a partial area of the cavity bottom when the closure device is fastened to the rotor assembly to seal the respective extraction aperture and wherein the shape of the first end is adapted to the shape of the cavity bottom to form a smooth transition of the surface of the first end with the surrounding surface of the cavity bottom.

In a case where a plurality of extraction apertures is foreseen on the centrifuge rotor, it is, of course, foreseen that a plurality of closure devices is provided, wherein each extraction aperture can be closed or sealed in a fluid-tight manner by a respective closure device.

Preferably, the closure device comprises a limit stop at the second end to restrict the movement of aforesaid closure device in the direction of the shaft axis when the closure device is fastened to the rotor assembly to ensure a correct alignment of the first end with the surrounding surface of the cavity bottom when the closure device is in the fastened/sealed position.

Further preferred, each of the plurality of closure devices comprises at least one elastomeric seal which is received in a groove of the closure device and deformed when the closure device is fastened to the rotor assembly to form a airtight seal between the rotor assembly and the closure device. The elastomeric seal improves the sealing of the centrifuge tube beds in the rotor assembly against the surrounding of the centrifuge rotor.

It can be foreseen that at least a partial area of the shaft of the device comprises external threads, wherein the extraction aperture comprises internal threads adapted to the shape and position of the external threads so that the closure device is fastened to the rotor assembly by the adapted threads. The adapted threading of the closure devices with the extraction aperture enables at the first hand to establish a secure fastening means of the closure device with the centrifuge rotor but furthermore enables to establish a airtight seal. The threading can be foreseen to extend in a counter rotation direction of the centrifuge to avoid an unthreading of the closure device during rotation of the centrifuge.

The second end of the shaft can comprise at least one interlocking element which protrudes at least partially in radial direction of the shaft and wherein the rotor assembly comprises at least one cutout and/or pocket adapted to receive said at least one interlocking element to form an interlocking structure with the closure device to fasten the closure device to the rotor assembly. The interlocking structure enables to realize a reliable fastening of the closure device to the rotor assembly.

The shaft can have a diameter in the range which lies between 0.5 mm up to 8 mm and which lies in the further preferred range between 0.5 and 2.0 mm.

Further preferred, it can be foreseen that the cavity bottom is formed by a narrowing surface in the direction towards the lower end of the rotor assembly and the at least one extraction aperture is located at the lowest point of the test tube bed with respect to the rotation centre axis. In the case that a swing bucket rotor is foreseen, the narrowing surface of the cavity bottom can be foreseen in each of the rotor buckets wherein the extraction aperture is located at the lowest point of the test tube bed in the static non-rotating and unswung case of the rotor buckets with respect to the rotating stem of the swing bucket rotor.

According to a second aspect of the current invention, a centrifuge or an ultracentrifuge is provided which comprises a centrifuge rotor or ultracentrigue rotor according to the first aspect of the current invention is provided.

According to a third aspect of the current invention, a sample retraction needle is provided which comprises a cannula extending along an axial axis from a distal end to a proximal end, wherein the proximal end is formed by a sharp closed tip to seal the proximal end of the sample retraction needle and at least one drainage hole positioned at the lateral side wall of the cannula.

The sharp closed tip of the sample retraction needle enables to penetrate the centrifuge tube by piercing the needle through the wall of the centrifuge tube. The drainage holes of the extraction needle are positioned at the side/lateral sidewalls of the needle cannula just below the needle tip at the proximal end. Such positioning of the drainage holes prevents needle clogging by small particles generated during puncture of the centrifuge tube. Furthermore, the fluid flow during the extraction by the extraction needle is improved as the drainage holes can be placed in a desired height position with respect to the lowest point of the centrifuge tube to immediately extract specific centrifugation fractions from the centrifuge tube. Alternatively, other designs of non-coring needle points (pencil point, deflected point) are preferably used for sample retraction from the centrifuge tube.

Preferably, the sample retraction needle comprises a needle cannula which has a conical shape along the axial axis, wherein the outer diameter of the cannula reduces in the direction towards the sharp-closed tip. The extraction needle has a conical shape that ensures a sealed connection between the centrifuge tube and/or the rotor assembly and the extraction needle. The conical shape with a reducing cross shape in the direction of the sharp closed tip enables an easy insertion of the extraction needle in the extraction aperture and realizes a self-alignment of the needle during the insertion with respect to the extraction aperture and the centrifuge tube.

A venting hole is required at the top of the centrifuge tube to remove the sample from the sealed centrifuge tube. The venting hole at the top of the centrifuge tube can be made with the same sample extraction needle as used to produce drainage hole at the bottom of the centrifuge tube for the extraction of the sample from the centrifuge tube. The venting hole at the top of the centrifuge tube is preferably made before the drainage hole at the bottom of the centrifuge tube. The venting and drainage needles are precisely inserted into the centrifuge tube by using a manually operated lever or with a robotic arm.

Preferably, the sharp closed tip is formed by a cone, preferably a circular cone, wherein the front surface of the proximal end is formed by the tip of the cone and the ground surface of the cone is adapted to the shape of the cannula end.

The cannula can be formed by a hollow stainless steel tube. Preferably, the cross section of the hollow stainless steel tube can be formed by a circle or an ellipse.

The cannula can have an outer diameter in the area of the distal end in the range of 0.7 to 1.5 mm.

It can be preferably foreseen that the distal end of the cannula is connected to a needle base, wherein the needle base has a diameter larger than the opening of the extraction aperture of a centrifuge rotor according to the second aspect of the current invention to act as a limiting device to limit the maximum insertion depth of the sample retraction needle in the centrifuge tube bed.

According to a fourth aspect of the current invention, a method for in-situ sample retraction from a centrifuge tube housed in a centrifuge tube bed of a centrifuge rotor according to the first aspect of the current invention is provided. The method comprises the steps of:

A) conducting the centrifugation of the samples contained in the centrifuge tubes and housed in the centrifuge rotor;

B) transferring the centrifuge rotor to a rotor stand, disassembling the centrifuge rotor;

C) choosing a first centrifuge tube housed in the centrifuge rotor of the plurality of centrifuge tubes from which the content should be extracted;

D) generating a venting hole in the area of the top of the chosen first centrifuge tube;

E) opening the respective extraction aperture of the centrifuge tube bed in which the first centrifuge tube is located by removing the respective closure device;

F) introducing a retraction needle preferably according to the third aspect of the current invention through the extraction aperture towards the outer wall of the centrifuge tube, piercing the centrifuge test tube wall and inserting the retraction needle into the first centrifuge test tube to generate a fluid connection to the inner volume of the centrifuge test tube;

G) extracting the content of the centrifuge test tube through the retraction needle; and H) preferably repeating steps C) to G) on at least a further centrifuge tube housed in the centrifugation rotor.

It can be foreseen that the order of specifically the steps D) and E) can be changed so that, for example, step E) is performed before step D).

Preferably, it can be foreseen that the sample retraction from the centrifuge tube is caused by displacing the centrifuge tube content under pressure with compressed gas. Alternatively, the sample can be displaced from centrifuge tube by evenly dosing a low density, preferably non-water-miscible liquid through a venting hole in centrifuge tube. Preferably, an HPLC-type pump or peristaltic pump or syringe pump that enable good flow control are used for this type of sample displacement from centrifuge tube. Alternatively, sample retraction from centrifuge tube is done by sample suction by using an appropriate pump.

According to a preferred method, the contents extracted by the retraction needle by the extraction needle is fed to at least one of the devices shown from the group of an ultraviolet-visual detection system, a fluorescence detection system, a light scattering detection system, a device for conducting a high performance liquid chromatography (HPLC) and/or an automated fraction collector.

It can be further foreseen that the first centrifuge tube is placed in a centrifuge tube stand prior to step D) and the following steps.

According to a fifth aspect, the current invention provides a usage of a centrifuge rotor according to the first aspect of the current invention or a centrifuge according to a second aspect of the current invention and preferably by a sample retraction needle according to the third aspect of the current invention by the method according to the fourth aspect of the current invention.

According to a sixth aspect of the current invention, an automated system for in-situ sample extraction is provided comprising:

a centrifuge according to the second aspect of the invention, and at least an extraction needle according to the third aspect of the invention;

wherein the system preferably is configured to conduct the method for in-situ sample retraction according to fourth aspect of the current invention.

Figure 2:
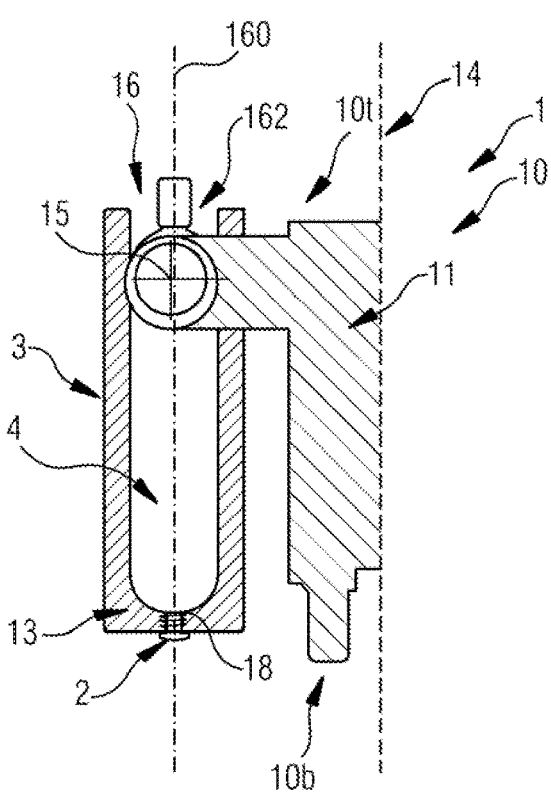
Figure 3A:
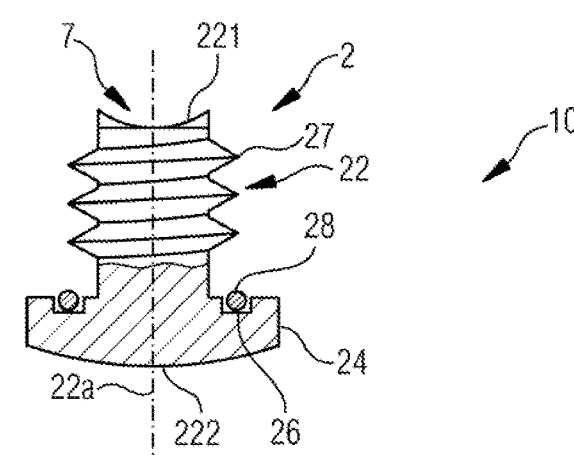
Figure 3B:
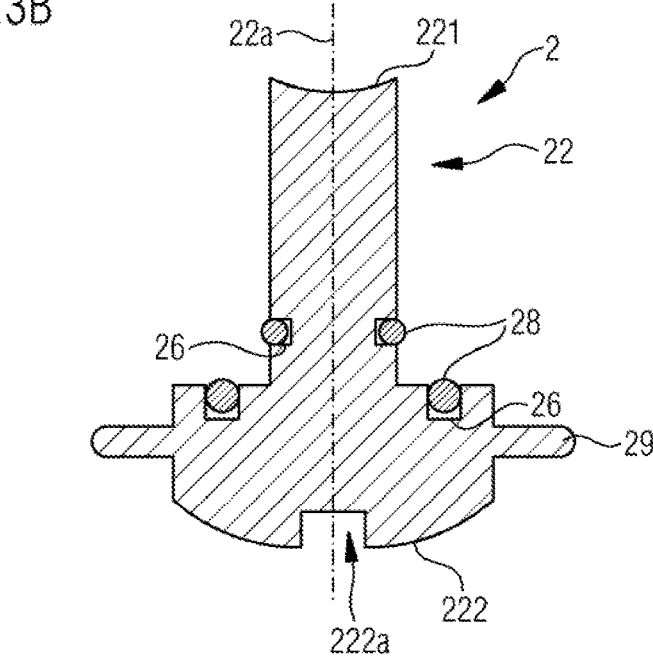
Figure 3C:
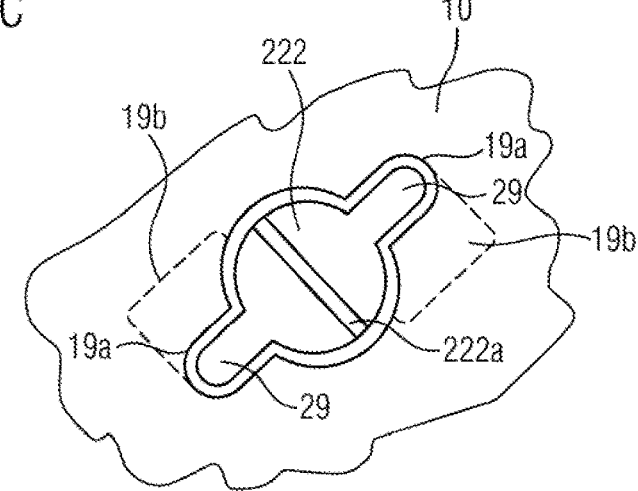
Figure 4:
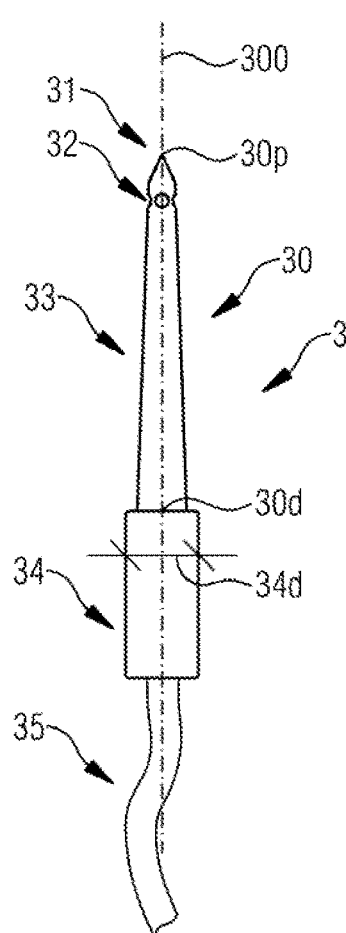
Figure 5:
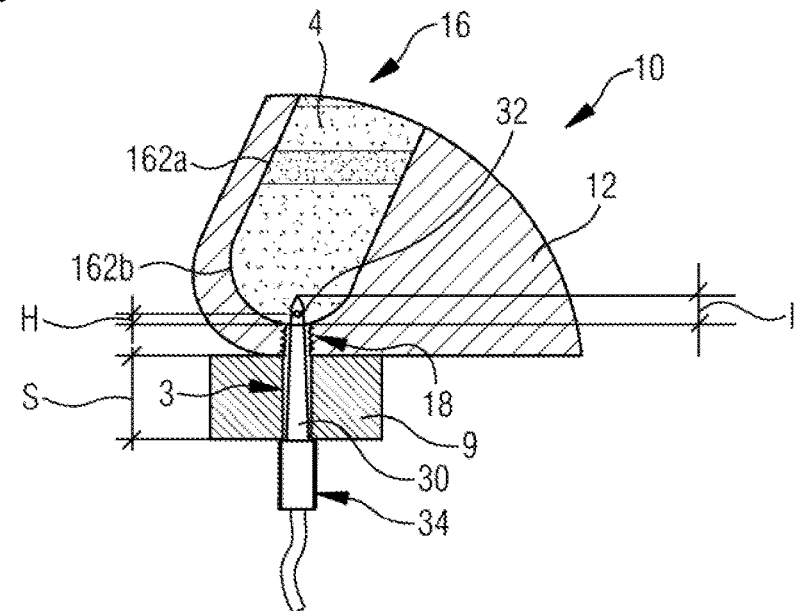
Figure 6:
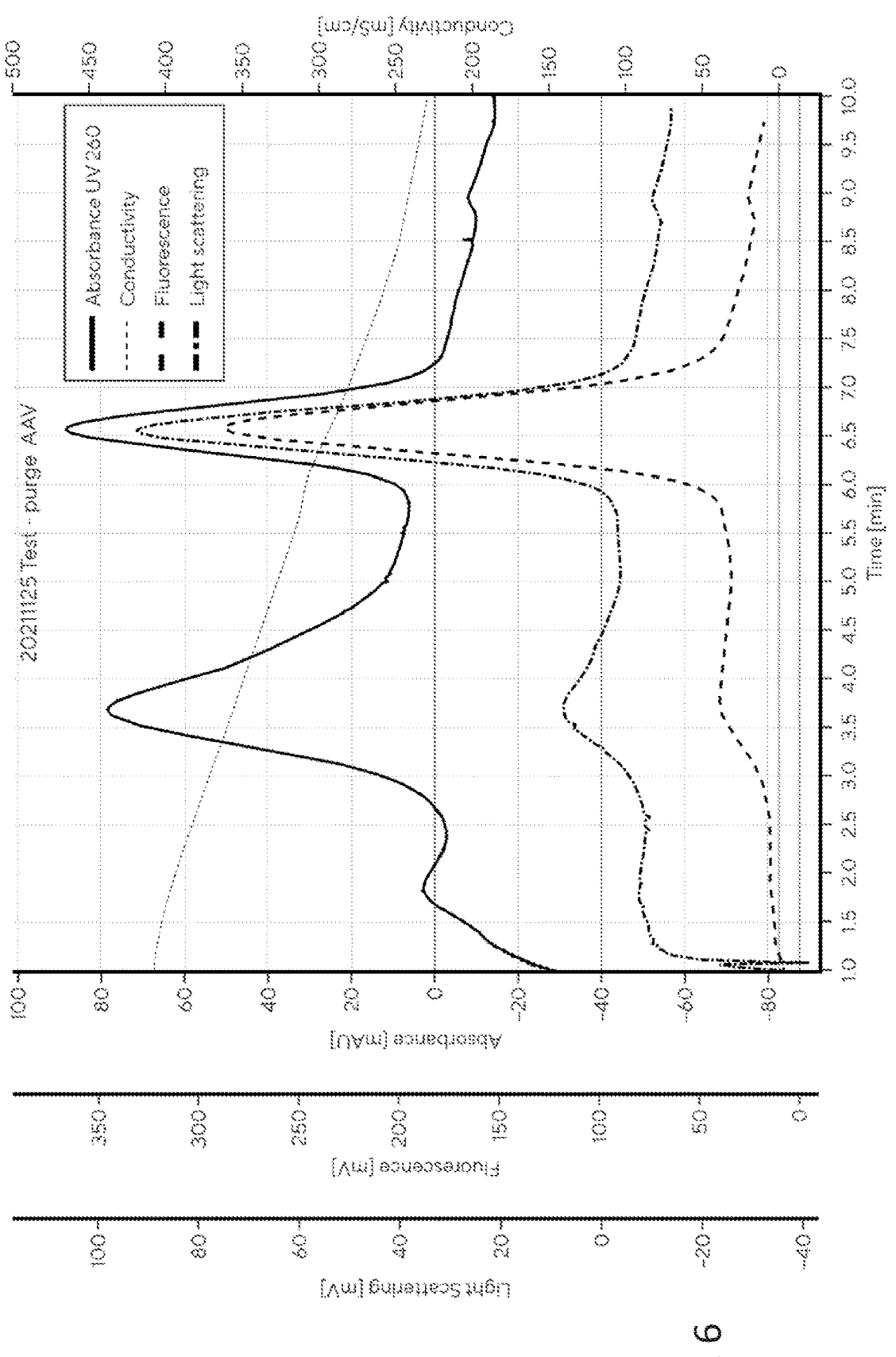
Figure 7:
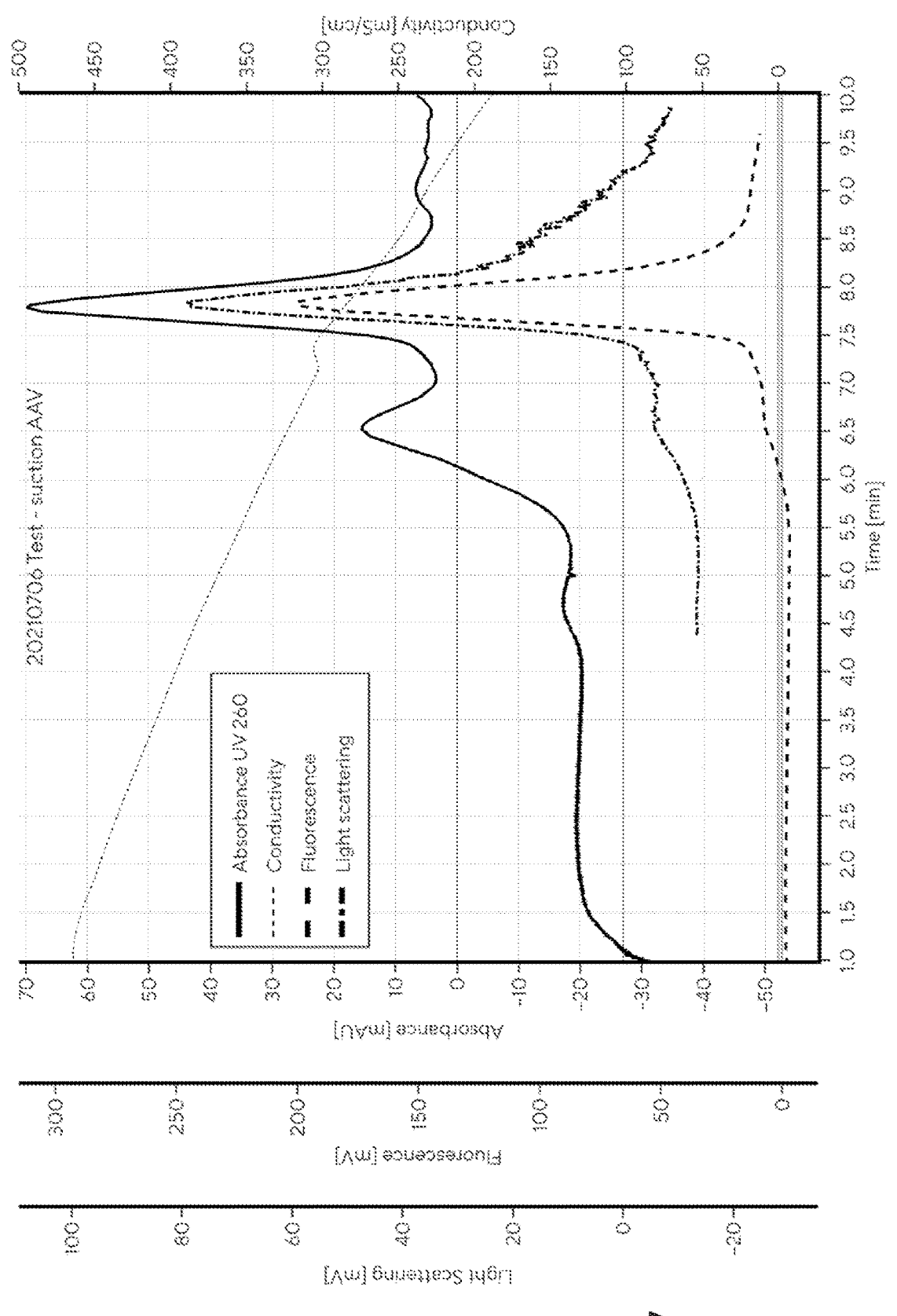

In the following, exemplary embodiments of the devices according to the current invention will be described with respect to the attached figures:

FIG. 1 shows the cross-section of a centrifuge rotor in the configuration of a fixed angle rotor, wherein a cut through an exemplary centrifuge tube bed with an extraction aperture which is closed by a closure device is shown, FIG. 2 shows the cross-section of a centrifuge rotor in the configuration of a swing bucket rotor, the figure shows a partial cut through a centrifuge tube bed of a swing bucket with an extraction aperture foreseen in the bottom in the centrifuge tube bed sealed by a closure device, FIG. 3A shows a first exemplary embodiment of a closure device, FIG. 3B shows a second exemplary embodiment of a closure device, FIG. 3C shows the closure device of FIG. 3B during the installation process to a rotor assembly of a centrifuge rotor, FIG. 4 shows an exemplary embodiment of a sample retraction needle, FIG. 5 shows a schematic representation of a sample retraction needle which is inserted to a centrifuge tube housed in a centrifuge rotor to extract a sample from aforesaid centrifuge tube, FIG. 6 shows a result of sample displacement from centrifuge tube by evenly dosing a low density liquid by high performance liquid chromatography pump through a venting aperture in centrifuge tube. The displaced sample is fed to an ultraviolet-visual detection system, a fluorescence detection system, a light scattering detection system, and a conductivity detection system, and FIG. 7 shows a result of sample suction from centrifuge tube with high performance liquid chromatography pump through an extraction aperture in centrifuge tube. The displaced sample is fed to an ultraviolet-visual detection system, a fluorescence detection system, a light scattering detection system, and a conductivity detection system.

Referring to FIG. 1, an exemplary embodiment of a centrifuge rotor 1 in the configuration of a fixed angle rotor is shown. The centrifuge rotor comprises a rotor assembly 10 which is formed by a rotor body 12. The rotor assembly 10 in the form of the fixed angle rotor body 12 is adapted for centrifugal rotation around a rotation centre axis 14 shown in FIG. 1 as dashed line. As is understood to the person skilled in the art, the rotor body 12 is rotationally symmetrical with respect to the rotation centre axis 14. In FIG. 1, a cross-section of a single one of the plurality of centrifuge tube beds 16 is shown with a longitudinal axis 160 of the centrifuge tube bed 16. The centrifuge tube bed 16 is defined by a tubular cavity 162 adapted to receive and support a centrifuge tube 4 during the centrifugation process. The tubular cavity 162 is formed in the material of the rotor body 12 and delimited by a cavity side wall 162a and a cavity bottom 162b. The cavity side wall 162a and the cavity bottom 162b together act as a bearing surface for the outer surface of a centrifuge tube 4 which can be housed in said tubular cavity 162 of the centrifuge tube bed 16. As can be taken from FIG. 1, the cavity bottom 162b comprises in the example of the FIG. 1 a single extraction aperture 18 which is closed in FIG. 1 by a closure device 2. In the exemplary embodiment according to FIG. 1, the cavity bottom 162b is formed to have a narrowing shape towards the bottom 10b of the centrifuge rotor assembly 10. The top of the rotor assembly 10 is marked with the reference sign 10t.

The cavity bottom 162b is formed in the example of FIG. 1 by a hemisphere.

The tubular cavities 162 of the centrifuge tube beds 16 of centrifuge rotor 1 are formed within the rotor body 12 of the fixed angle rotor and wherein the at least one extraction aperture 18 is formed as a hole to extend through the rotor body 12 to fluidly connect the tubular cavity 162 with the surrounding of the rotor assembly 10.

The FIG. 2 shows an alternate configuration of a centrifuge rotor 1 wherein the rotor assembly 10 is formed by a swing bucket rotor which comprises a plurality of rotor buckets 13 which are pivotally connected to a rotating stem 11 wherein the plurality of rotor buckets 13 comprises at least one tubular cavity 162 to form at least one centrifuge tube bed 16 and wherein the at least one extraction aperture 18 extends through the body of the respective rotor bucket 13. The tubular cavity 162 is also formed in the material of the rotor buckets 13. In FIG. 2, only one cut-through of a rotor bucket 13 is shown wherein a single exemplary centrifuge tube 4 is received. The swing bucket rotor as shown in FIG. 2 is configured to rotate around the central rotation axis 14, wherein each of the plurality of swing buckets 13 is pivotally connected to the rotating stem 11 through a swing out axis 15. The longitudinal axis 160 of the centrifuge bed 16 in FIG. 2 is shown in the unswung or static condition wherein the aforesaid axis 160 extends approximately parallel to the rotation centre axis 14 of the rotating stem 11.

The extraction aperture 18 which is formed in the housing or material defining the swing bucket 13 is closed and sealed in an airtight manner by a closure device 2.

The FIG. 3A shows a first exemplary embodiment of a closure device 2 wherein the closure device 2 is formed as a capping screw which comprises a shaft 22 which extends along a shaft axis 22a from a first end 221 to a second end 222 wherein the first end 221 forms a partial area of the cavity bottom 162b in a situation when the closure device 2 is fastened to the rotor assembly 10 as can be derived from the examples shown in the FIGS. 1 and 2. As can be taken from FIG. 2, the first end 221 is adapted to the shape of the cavity bottom 162b to form a smooth transition of the surface of the first end 221 and the surrounding surface of the cavity bottom 162b. The closure device 2 as shown in the configuration of FIG. 3 further comprises a limit stop 24 at the second end 222 to restrict the movement of the closure device 2 in the direction along the shaft axis 22a when the closure device 2 is fastened to the rotor assembly 10 to ensure the correct alignment of the first end 221 with the surrounding surface of the cavity bottom 162b. The closure device 2 as shown in FIG. 3 comprises a groove 26 to receive one elastomeric seal 28 shown in FIG. 3 configured as an O-ring. The elastomeric seal 28 is received in aforesaid groove 26 of the closure device and deformed when the closure device 2 is fastened to the rotor assembly 10. When the closure device 2 is fastened to the rotor assembly 10, the shown closure device 2 according to FIG. 3 mates with the outer surface of the rotor body 12 or the body of the rotor bucket 13 at least in the area of the limit stop 24 and elastically deforms the elastomeric seal 28 to define an airtight seal. As can also be taken from the exemplary embodiment of the closure device 2, a partial area of the shaft 22 comprises external threads 27 wherein the extraction aperture 18 comprises internal threads which are adapted to the shape and position of the external threads 27 so that the closure device can be fastened to the rotor assembly 10 by the adapted threads 27.

The FIG. 3B shows a second exemplary embodiment of a closure device 2 wherein the closure device 2 is configured to form an interlocking structure with the rotor assembly 10 to realize a fixation. The closure device 2 as shown in FIG. 3B differs from the device as shown in FIG. 3A that no external threads 27 are provided in the area of the shaft 22 to realize the fixation of the closure device 2 to the rotor assembly 10. The closure device 2 according FIG. 3B comprises two interlocking elements 29 to enable a fastening of the closure device 2 to the rotor assembly 10. The interlocking elements 29 can be provided in addition or alternative to the external treads 27 as described with respect to FIG. 3A. The closure device 2 according to FIG. 3B comprises two elastomeric seals 28, wherein one of the seals 28 is arranged to be received in a groove 26 in the area of the shaft 22 and a further elastomeric seal 28 is arranged in a groove 26 located in the area of the second end 222 at a mating surface of the limit stop 24 with the rotor assembly 10. The second 222 of the locking device 2 comprises in the area of the limit stop 24 on a surface facing away from the rotor housing a recess 222a whereby the closure device 2 is enabled to be rotated around the shaft axis 22a to fasten or unfasten the closure device 2 to the rotor housing 10.

As is shown in FIG. 3C detailing the closure device 2 during the fastening process to the rotor housing 10. The FIG. 3C shows a top view on the second end 222 of the closure device 2. During the fastening of the closure device 2 the device 2 is placed in the area of the extraction aperture 18, wherein the interlocking elements 29 are placed in respective cutouts 19a of the rotor housing 10. To fasten the closure device 2 to the rotor housing 10 the closure device is rotated around the shaft axis 22a to move the interlocking elements 29 into the adapted pockets 19b of the rotor housing 10. The interlocking elements 29 and the cutouts 19a as well as the pockets 19b are adapted to each other to form an interlocking structure and thereby to realize a secure fastening of the closure device 2 to the rotor housing.

The FIG. 4 shows an exemplary embodiment of a sample retraction needle 3 wherein the sample retraction needle 3 comprises a cannula 30 which extends along an axial axis 300 from a distal end 30d to a proximal end 30p wherein the proximal end 30p is formed by a sharp-closed tip 31 to seal the proximal end 30p of the cannula 30 of the sample retraction needle 3. In the embodiment as shown in FIG. 4, the sample retraction needle 3 comprises four drainage holes 32 which are positioned in the area of the lateral side wall 33 of the cannula 30. In the schematic view of FIG. 3 only three of the four drainage holes 32 are shown to be evenly distributed at the lateral side wall 33 around the axial axis 300 in circumferential direction of the cannula 30.

As can also be taken from FIG. 4, the needle cannula 30 has a conical shape along the axial axis 300 wherein the outer diameter of the cannula 30 reduces in the direction towards the sharp-closed tip 31. The sharp-closed tip 31 is formed by a circular cone wherein the front surface of the proximal end 30p is formed by the tip of the cone. The ground surface of the cone is adapted to the shape of the cannula end.

The cannula 30 of the retraction needle 3 can be formed by a hollow stainless steel tube and the cannula 30 can have an outer diameter in the area of the distal end 30d in the range of 0.7 to 1.5 mm. The distal end 30d of the cannula 3 is connected to a needle base 34 wherein the needle base 34 has a diameter 34d which is dimensioned to be larger than the opening of the extraction aperture 18 of the centrifuge rotor 1 according to the present invention. The needle base 34 is thereby configured to act as a limiting device to limit the maximum insertion depth I of the sample retraction needle 3 in the centrifuge tube bed 16.

FIG. 5 shows a schematic representation of a sample retraction needle 3 according to the present invention when inserted to a centrifuge tube 4 housed in an exemplary embodiment of a rotor assembly 10 of a fixed angle rotor through a foreseen extraction aperture 18 in a rotor body 12 and inserted to the centrifuge tube 4 to extract the samples and/or fractions of the sample contained in the centrifuge tube 4 after the centrifugation process. FIG. 5 shows the use of a limiting device 9 which has a thickness S wherein the limiting device 9 has a through-hole through which the insertion needle 3 can be guided and inserted through the extraction aperture 18 to the centrifuge tube bed 16 and inserted in the centrifuge tube 4. By the use of the limiting device 9, the retraction needle 3 can be inserted in the centrifuge tube 4 to a desired and previously defined insertion depth I so that the foreseen drainage holes 32 are placed in a desired height H above the lowest point of the centrifuge tube bed 16. The aforementioned configuration enables to insert the extraction needle 3 to a desired insertion depth I and, thereby, to place the drainage holes in a desired height above the bottom of the centrifuge tube 4.

The FIG. 6 shows an example of a sample displacement from a centrifuge tube by evenly dosing a low density liquid by high performance liquid chromatography pump through a venting aperture in the centrifuge tube.

Density gradient fractionation was performed on a Sorvall™ WX 90+ ultracentrifuge (Thermo Scientific) using 11.5 mL polyethylene UltraCrimp® centrifuge tubes (Thermo Scientific) in a T890 fixed-angle rotor. Samples of Adeno Associated Virus (AAV) were mixed with concentrated cesium chloride to obtain an AAV sample in 3 M cesium chloride. Centrifugation was performed at 53,500 RPM for 24 h at room temperature. The tube was then fixed in a stand and a venting aperture was pierced near the top with a hypodermic needle (23 gauge, 70 mm, B Braun). Another hypodermic needle was used to pierce extraction aperture at the bottom of the centrifuge tube. Tube content was displaced from a centrifuge tube by pumping water at constant flow rate of 1 mL/min through the venting aperture at the top of the centrifuge tube with a HPLC pump of a PATfix™ LPG HPLC system (BIA separations). The extraction aperture at the bottom of centrifuge tube was connected directly to the monitor array of a PATfix™ LPG HPLC system. This evacuated the tube in order of decreasing density. UV absorbance was monitored at 260 nm (solid trace). Intrinsic fluorescence was monitored at an excitation wavelength of 280 nm and an emission wavelength of 348 nm with a fluorescence detector (Shimadzu, dashed trace). Light scattering was monitored at a 90° angle with a DAWN® HELEOS II multi-angle light scattering detector (Wyatt Technology, dash-dotted black trace). Caesium chloride density is represented by the conductivity profile (dotted trace). The higher the conductivity, the higher the density of the cesium chloride.

The FIG. 7 shows an example of a sample suction from a centrifuge tube with high performance liquid chromatography pump through an extraction aperture in centrifuge tube.

Density gradient fractionation was performed on a Sorvall™ WX 90+ ultracentrifuge (Thermo Scientific) using 11.5 mL polyethylene UltraCrimp® centrifuge tubes (Thermo Scientific) in a T890 fixed-angle rotor. Samples of Adeno Associated Virus (AAV) were mixed with concentrated cesium chloride to obtain an AAV sample in 3 M cesium chloride. Centrifugation was performed at 53,500 RPM for 24 h at room temperature. The tube was then fixed in a stand, a venting aperture was pierced near the top with a hypodermic needle (23 gauge, 70 mm, B Braun) and left open to the normal atmospheric pressure. Another hypodermic needle was used to pierce extraction aperture at the bottom of the centrifuge tube. Tube content was extracted from a centrifuge tube at constant flow rate of 1 m/min through the extraction aperture at the bottom of the centrifuge tube with a HPLC pump of a PATfix™ LPG HPLC system (BIA separations). The HPLC pump directed the content of the centrifuge tube to the monitor array of of a PATfix™ LPG HPLC system. This evacuated the tube in order of decreasing density. UV absorbance was monitored 260 nm (solid trace). Intrinsic fluorescence was monitored at an excitation wavelength of 280 nm and an emission wavelength of 348 nm with a fluorescence detector (Shimadzu, dashed trace). Light scattering was monitored at a 90° angle with a DAWN® HELEOS II multi-angle light scattering detector (Wyatt Technology, dash-dotted trace). Caesium chloride density is represented by the conductivity profile (dotted trace). The higher the conductivity, the higher the density of the cesium chloride.

The invention claimed is:

1. Centrifuge rotor (1) comprising:
   a rotor assembly (10) adapted for centrifugal rotation around a rotation center axis (14), with a plurality of centrifuge tube beds (16), each with a longitudinal axis (160),
   wherein each centrifuge tube bed (16) comprises a tubular cavity (162) which is defined by a cavity sidewall (162a) and a cavity bottom (162b),
   wherein at least one of the plurality of cavity bottoms (162b) comprises at least one extraction aperture (18), which connects the tubular cavity (162) to the exterior of the rotor assembly (10), characterized in that the cavity sidewall (162a) and the cavity bottom (162b) together act as a bearing surface for the outer surface of a centrifuge tube (4) when received in said centrifuge tube bed (16),
   wherein at least one closure device (2) is removably fastened to the rotor assembly (10) to seal each of the at least one extraction apertures (18) in an airtight manner, wherein each of the at least one closure devices (2) comprises a shaft (22) extending along a shaft axis (22a) from a first end (221) to a second end (222), wherein the shaft (22) is adapted to the geometry of the extraction aperture (18), wherein the first end (221) forms a partial area of the cavity bottom (162b) when the closure device (2) is fastened to the rotor assembly (10) and wherein the shape of the first end (21) is adapted to the shape of the cavity bottom (162b) to form a smooth transition of the surface of the first end (221) and the surrounding surface of the cavity bottom (162b), and
   wherein the second end (222) of the shaft (22) comprises at least one interlocking element (29) which protrudes at least partially in radial direction of the shaft (22) and wherein the rotor assembly (10) comprises at least one cutout (19a) and/or at least one pocket (19b) adapted to receive said at least one interlocking element (29) to form an interlocking structure when the closure device (2) is fastened to the rotor assembly (10).

2. Centrifuge rotor (1) of claim 1, wherein the rotor assembly (10) is a fixed angle rotor formed by a rotor body (12), wherein the plurality of centrifuge tube beds (16) are formed as tubular cavities (162) within the rotor body (12) and wherein the at least one extraction aperture (18) extends through the rotor body (12).

3. Centrifuge rotor (1) of claim 1, wherein the rotor assembly (10) is a swing bucket rotor comprising a plurality of rotor buckets (13) pivotable connected to a rotating stem (11), wherein the plurality of rotor buckets (13) comprises at least one tubular cavity (162) to form the centrifuge tube bed (16) and wherein the at least one extraction aperture (18) extends through at least one body of the respective rotor bucket (13).

4. Centrifuge rotor of claim 1, wherein each of the plurality of closure devices (2) comprises a limit stop (24) at the second end (222) to restrict the movement of the closure device (2) in the direction of the shaft axis (22a), when the closure device (2) is fastened to the rotor assembly (10) to ensure the correct alignment of the first end (221) with the surrounding surface of the cavity bottom (162b).

5. Centrifuge rotor of claim 1, wherein each of the plurality of closure devices (2) comprises at least one elastomeric seal (28), which is received in a groove (26) of the closure device (2) and deformed when the closure device (2) is fastened to the rotor assembly (10) to form an airtight seal with the rotor assembly (10).

6. Centrifuge rotor of claim 1, wherein at least a partial area of the shaft comprises external threads (27), wherein the extraction aperture (18) comprises internal threads (27) adapted to the shape and position of the external threads (27), so that the closure device (2) is fastened to the rotor assembly (10) by the adapted threads (27).

7. Centrifuge rotor of claim 1, wherein the shaft has a diameter (22d) that lies in the range between 0.5 mm up to 8.0 mm and which lies in the preferred range between 0.5 mm and 2.0 mm.

8. Centrifuge rotor of claim 1, wherein the cavity bottom (162b) is formed by a narrowing surface in the direction towards the lower end of the rotor assembly (10) and the at least one extraction aperture (18) is located at the lowest point of the test tube bed (16) with respect to the rotation center axis (14).

9. Centrifuge or ultracentrifuge comprising: a centrifuge rotor according to claim 1.

10. Method for in-situ sample retraction from a centrifuge tube (4) housed in a centrifuge tube bed (16) of a centrifuge rotor (1) of claim 1, the method comprising the steps:
   A) conducting the centrifugation of the samples contained in the centrifuge tubes (4) and housed in the centrifuge rotor (1);
   B) transferring the centrifuge rotor (1) to a rotor stand, disassembling the centrifuge rotor (1)
   C) choosing a first centrifuge tube (4) housed in the centrifuge rotor (1) of the plurality of centrifuge tubes (4) from which the content should be extracted;
   D) generating at least one venting hole in the area of the top of the chosen first centrifuge tube (4);
   E) opening a respective extraction aperture (18) of a centrifuge tube bed (16) in which the first centrifuge tube (4) is located by removing a respective closure device (2);
   F) introducing a sample retraction needle (3) through the extraction aperture (18) towards the outer wall of the centrifuge tube (4), piercing the centrifuge tube wall and inserting the sample retraction needle (3) into the first centrifuge tube to generate a fluid connection to the inner volume of the centrifuge tube (4); and
   G) extracting the content of the centrifuge tube (4) through the sample retraction needle (3).

11. Method according to claim 10, wherein the sample retraction from the centrifuge tube (4) is caused by displacing the sample under pressure with compressed gas or by sample suction out of the centrifuge tube (4) by using an appropriate pump.

12. Method according to claim 10, wherein the sample is displaced from the centrifuge tube (4) by evenly dosing a low density liquid through the venting hole in centrifuge tube.

13. Method according to claim 12, wherein using a high-performance liquid chromatography, HPLC,-type pump or peristaltic pump or syringe pump that enable for sample displacement from centrifuge tube (4).

14. Method according to claim 12 wherein the low density liquid is non-water-miscible.

15. Method according to claim 10, wherein the contents extracted by the sample retraction needle (3) is fed to at least one of the devices chosen from the group of a UV-VIS detection system, a fluorescence detection system, a light scattering detection system, a device for conducting a high performance liquid chromatography and/or an automated fraction collector.

16. Method according to claim 10, wherein the first centrifuge tube (4) is placed in a centrifuge tube stand prior to step D).

17. An automated system for in-situ sample extraction comprising:

a centrifuge or an ultracentrifuge and at least an extraction needle, wherein the system is configured to conduct the method for in-situ sample retraction according to claim 12.

18. Method according to claim 10 further comprising the step:

H) repeating steps C) to G) on at least a further centrifuge tube (4) housed in the centrifugation rotor (1).

* * * * *